US010083516B2

(12) United States Patent
Rajan Y et al.

(10) Patent No.: US 10,083,516 B2
(45) Date of Patent: Sep. 25, 2018

(54) METHOD FOR SEGMENTING A COLOR IMAGE AND DIGITAL MICROSCOPE

(71) Applicant: CARL ZEISS MICROSCOPY GMBH, Jena (DE)

(72) Inventors: Joshua Sujit Rajan Y, Kamataka (IN); Utpal Sarkar, West Bengal (IN); Jochen Schweizer, Fuerstenfeldbruck (DE); Markus Gnauck, Jena (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 0 days.

(21) Appl. No.: 15/308,759

(22) PCT Filed: Apr. 29, 2015

(86) PCT No.: PCT/EP2015/059417
§ 371 (c)(1),
(2) Date: Nov. 3, 2016

(87) PCT Pub. No.: WO2015/169675
PCT Pub. Date: Nov. 12, 2015

(65) Prior Publication Data

US 2017/0116746 A1    Apr. 27, 2017

(30) Foreign Application Priority Data

May 4, 2014   (DE) .................. 10 2014 106 224

(51) Int. Cl.
*G06T 7/11*      (2017.01)
*G06K 9/00*      (2006.01)
(Continued)

(52) U.S. Cl.
CPC .............. *G06T 7/11* (2017.01); *G02B 21/365* (2013.01); *G06K 9/0014* (2013.01); *G06T 7/90* (2017.01);
(Continued)

(58) Field of Classification Search
CPC ............. G06T 7/90; G06T 2207/10024; G06T 2207/10056; G02B 21/365; G06K 9/0014
See application file for complete search history.

(56) References Cited

U.S. PATENT DOCUMENTS

2004/0008885 A1   1/2004   Caldato et al.
2005/0196037 A1   9/2005   Muenzenmayer et al.
(Continued)

FOREIGN PATENT DOCUMENTS

DE    44 19 395 A1    12/1995
DE    102 39 801 A1    3/2004
DE    698 30 583 T2    6/2006

OTHER PUBLICATIONS

International Preliminary Report on Patentability dated Nov. 8, 2016, issued in connection with corresponding International Application No. PCT/EP2015/059417 (9 pages total).
(Continued)

*Primary Examiner* — Ruiping Li
(74) *Attorney, Agent, or Firm* — Stuart H. Mayer; Mayer & Williams PC

(57) ABSTRACT

The present invention relates to a method for automatically segmenting a color image composed of pixels having been captured for example using a digital microscope. The method provides for a color to be selected representing a region to be segmented of the color image. The colors assigned to the pixels and the color selected are in accordance with a first color model. A clearance for each of the pixels is determined representing a distance between the selected color and the color of the corresponding pixel. The colors assigned to the pixels and the color selected are in accordance with a perception-oriented second color model. One of the pixels is assigned to the segmented region when the clearance assigned to the corresponding pixel is below a settable threshold value and when the hue assigned to the
(Continued)

corresponding pixel is within a settable interval around the hue assigned to the selected color.

9 Claims, 1 Drawing Sheet

(51) Int. Cl.
   *G06T 7/90* (2017.01)
   *G02B 21/36* (2006.01)
(52) U.S. Cl.
   CPC .............. *G06T 2207/10024* (2013.01); *G06T 2207/10056* (2013.01)

(56) References Cited

U.S. PATENT DOCUMENTS

| | | |
|---|---|---|
| 2010/0098331 A1 | 4/2010 | Meng et al. |
| 2010/0202684 A1 | 8/2010 | Mattauscg et al. |
| 2014/0105489 A1* | 4/2014 | Chittar ................ G06F 17/3025 382/162 |

OTHER PUBLICATIONS

Selvarasu, N. et al. "Euclidean Distance Based Color Image Segmentation of Abnormality Detection from pseudo Color Thermographs", International Journal of Computer Theory and Engineering, vol. 2, No. 4, Aug. 2010, 1793-8201 (3 pages total).

Zakir, U. et al. "Road sign segmentation based on color spaces: A Comparative Study", Proceedings of the 11th lasted International Conference on Computer Graphics and Imaging, Innsbruck, Austria, 2010 (8 pages total).

Zhan, Chi et al., "A new method of color image segmentation based on intensity and hue clustering", Pattern Recognition, 2000, Proceedings 15th International Conference, vol. 3, IEEE, 2000 (4 pages total).

Herodotou N et al: "A color segmentation scheme for object-based video coding", Advances in Digital Filtering and Signal Processing, 1998 IEEE Symposium on Victoria, BC, Canada Jun. 5-6, 1998, New York, NY (5 pages total).

Ikonomaki S N et al: "Color Image Segmentation for Multimedia Applications", Journal of Intelligent and Robotic Systems 28: 5-20, 2000. (16 pages total).

* cited by examiner

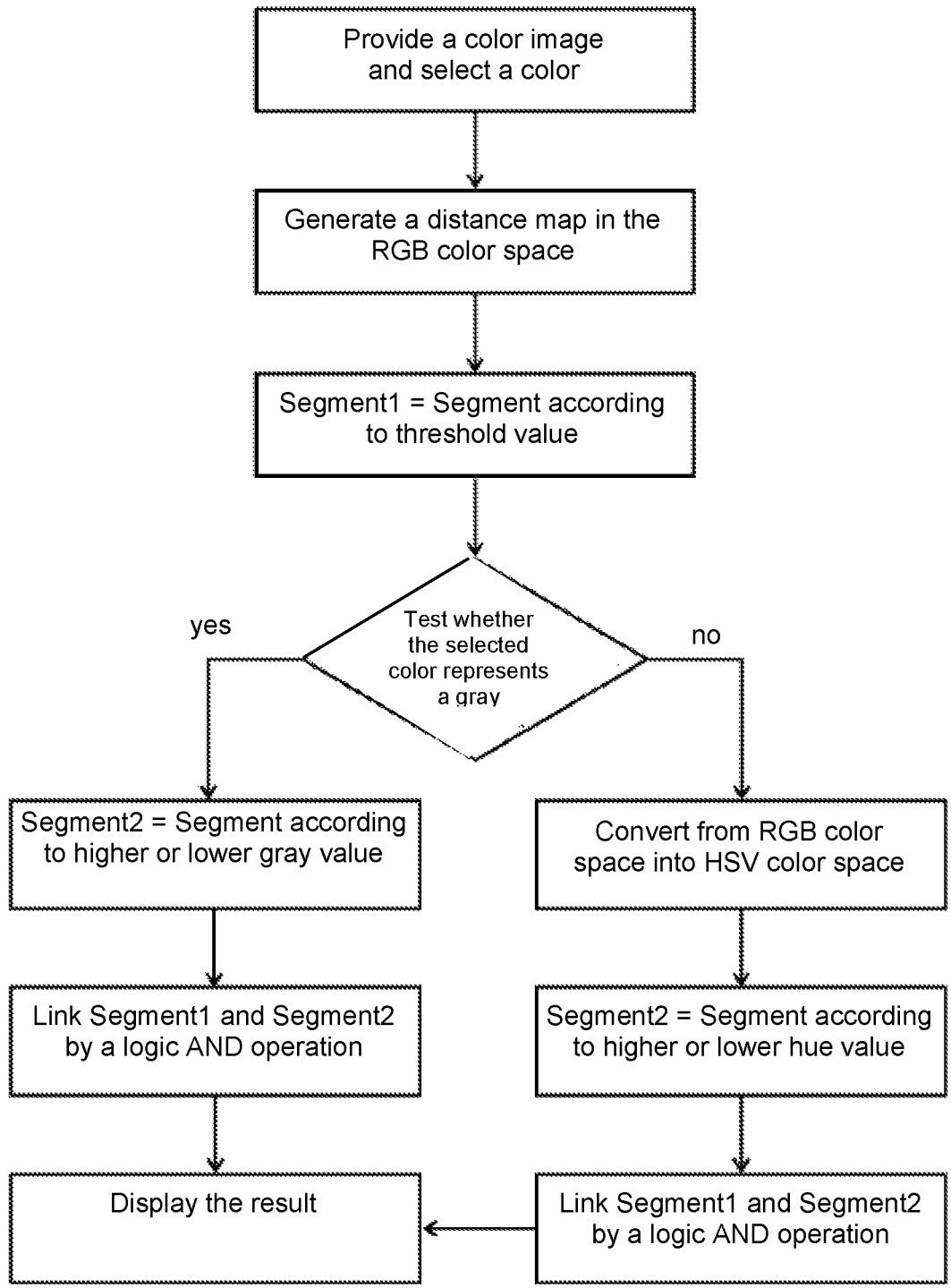

METHOD FOR SEGMENTING A COLOR IMAGE AND DIGITAL MICROSCOPE

FIELD

The present invention relates to a method for segmenting a color image composed of pixels which has been captured, for example, using a digital microscope and is intended to be subjected to automatic analysis. The invention furthermore relates to a digital microscope with which the method according to the invention can be implemented.

BACKGROUND

DE 698 30 583 T2 discloses an image data processing method that involves receiving input data which are divided into elementary units of information. Reference is made therein to the difference in suitability of the HLS color space and the RGB color space for various analyses.

From DE 44 19 395 A1 a method for analyzing color images for the purpose of object recognition is known, in which RGB image values are converted to the HSI color space to enable individual pixels to be classified based on their color.

DE 102 39 801 A1 teaches a method for extracting texture features from a multichannel image. According to a second embodiment, features are generated for the classification, which are calculated in the RGB space based on a color distance measure and in the HSV space using binary masks that are generated there.

In Selvarasu, N. et al. "Euclidean Distance Based Color Image Segmentation of Abnormality Detection from pseudo Color Thermographs", International Journal of Computer Theory and Engineering, Vol. 2, No. 4, August 2010, 1793-8201, the use of the Euclidean distance for classifying individual pixels is described. In that case, a representative pixel is selected, which is used for calculating the Euclidean distance for every other pixel. If the distance is less than or equal to a predetermined threshold value the pixel is retained, and if not it is removed, so that in the end, only one segmented zone can be seen. Only one color space is used in this process. The segmentation is carried out based solely on the threshold value for the clearance. The interval for the hue is disregarded.

In Zakir, U. et al. "Road sign segmentation based on color spaces: A Comparative Study", Proceedings of the 11th Lasted International Conference on Computer Graphics and Imaging, Innsbruck, Austria, 2010, the combination of the color value from the HSV color space with the chrominance from the YUV color space is described by an AND operation. In this case only intervals are used for segmentation.

In Zhan, Chi et al., "A new method of color image segmentation based on intensity and hue clustering", Pattern Recognition, 2000, Proceedings 15th International Conference, Vol. 3, IEEE, 2000, the correlation between hue and intensity is described. In this case, these values are determined within the HSI color space.

SUMMARY

The object of the present invention, proceeding from the prior art, is to improve the segmenting of color images, especially color images that have been captured using a microscope, such that it more closely approaches human perception.

The stated object is achieved by methods according to appended claims 1 and 2, and by a digital microscope according to the appended alternative independent claim 9.

The method according to the invention is used for automatically segmenting a color image composed of pixels which has been captured in particular using a digital microscope. A digital microscope is understood here not as a microscope with which the user views the object to be microscoped directly through an objective lens, but instead as a microscope that comprises an image capturing unit, in particular an electronic image converter. The images captured by the image converter are processed as digital information and are displayed to the user on a display unit, specifically a monitor. Most digital microscopes of this type have automatic image analysis functions, for example in the context of Quality Assurance and Quality Control (QA/QC). The method according to the invention relates specifically to such image analysis.

In segmenting, at least one region of the color image which represents, for example, an object imaged in the color image without the background is determined, so that the silhouette of the object determines the boundary of the region. The at least one segmented region may also represent a component of a composite object or a medium which is imaged multiple times in the color image. As a result, such a segmented region is typically not rectangular, but randomly shaped. The region also does not have to be contiguous, and a plurality of segmented regions may be determined by segmenting. In principle, the region to be segmented may be a region that will be used exclusively for further analysis, or that will not be used for further analysis at all.

In the method according to the invention, segmentation is carried out based on the colors assigned to the pixels, each of which can be described by a color point. The method according to the invention therefore comprises a step in which a color is selected which represents at least one region to be segmented of the color image. This selection is preferably made by the user, in particular via a human/machine interface. Preferably, a plurality of pixels of the region to be segmented will have the selected color or at least a color that is close to the selected color.

In one step of the method according to the invention, the colors assigned to the pixels and the selected color are provided in accordance with a first color model based on three color stimuli. The three color stimuli are preferably formed by three primary colors of an additive color mixture. The first color model is particularly preferably the RGB color model. Alternatively, the first color model is, for example, the CMYK color model or a similar color model. Since the RGB color model is widely used in image processing, in most cases the provision of the colors assigned to the pixels and the selected color in accordance with the RGB color model requires no extra effort, since the color image in question and the selected color are already described in accordance with the RGB color model.

In a further step of the method according to the invention, a clearance for each of the pixels is determined. The clearance in each case represents a distance between the selected color described in accordance with the first color model and the color of the respective pixel, described in accordance with the first color model. The clearance in each case is therefore the distance between the selected color and the color of the corresponding pixel in a color space formed in accordance with the first color model.

The clearance is particularly preferably defined by the Euclidean distance. However, clearances of other metrics may also be used.

In a further step of the method according to the invention, the colors assigned to the pixels and the selected color are provided in accordance with a perception-oriented second color model. The second color model is based on perception-oriented variables, such as color information and intensity information. The color information comprises hue and color saturation. The hue is also referred to as color value. According to the invention, at least one hue of the colors assigned to the pixels and one hue of the selected color are determined in each case. The second color model is particularly preferably the HSV color model. The second color model may also be the HSI color model, the HSB color model, or the HSL color model, the more common form of which is the HSV color model. The HSV color model includes a component referred to as "hue", which corresponds to the color. Thus, when the HSV color model is used, the hue component is determined in each case at least for the colors assigned to the pixels and for the selected color.

In a further step of the method according to the invention, one of the pixels is assigned to the segmented region when the clearance assigned to the corresponding pixel is below a settable threshold value and when the hue assigned to the corresponding pixel is within a settable interval around the hue assigned to the selected color. These two conditions are linked to one another by a logic conjunction, so that both conditions must be met in order for the corresponding pixel to be assigned to the segmented region. The threshold value can preferably be set by the user, particularly preferably in interactive form via a human/machine interface. The interval, i.e. the limits of the interval, can also preferably be set by the user, particularly preferably in interactive form via a human/machine interface.

Each pixel is preferably checked for the two conditions to determine whether it should be assigned to the segmented region or should not be assigned to the segmented region. Thus a pixel is assigned to the segmented region when the clearance assigned to the corresponding pixel is below the settable threshold value and when, in the settable interval, the hue assigned to the corresponding pixel is around the hue assigned to the selected color, preferably for each of the pixels.

It is a particular advantage that the method according to the invention combines the advantages of the various color models with respect to their suitability for segmentation. Perception-oriented color models, such as the HSV color model, are easy for human users to interpret, however they have the disadvantage that the selection of an achromatic color, such as black, gray or white, will include all possible hues in segmentation, which is not correct. It is also difficult for users to make adjustments for the three components of hue, saturation and intensity in order to detect the desired color. The color models that are based on three color stimuli, such as the RGB color model, have the disadvantage that a clearance, such as the Euclidean distance, corresponds only partially to the distance perceived by humans between two colors. By combining the advantages of the two different color models, the method according to the invention much more closely approximates human perception. The method according to the invention has two parameters, specifically the threshold value for clearance and the interval for hue, which can be adjusted intuitively and at low cost by the human user so as to achieve an optimum result during segmenting.

A particularly preferred embodiment of the method according to the invention further comprises a step in which a check is made to determine whether the selected color is achromatic. A color is achromatic if it has no hue. The achromatic colors are black, gray and white. The check to determine whether the selected color is achromatic preferably involves checking to determine whether the selected color described in accordance with the first color model has equal values for the three color stimuli, thus, for example, whether the selected color described in accordance with the RGB color model has equal values for the components red, green and blue.

In a further step of this particularly preferred embodiment, which is carried out when the selected color is achromatic, intensity values for the colors assigned to the pixels and for the selected color are determined. Thus an intensity value is assigned to each pixel and to the selected color. The intensity value is preferably formed by a gray value or by the component of the HSV color model referred to as "value", or by the component of the HSI color model referred to as "intensity".

In a further step of this particularly preferred embodiment which is carried out when the selected color is achromatic, one of the pixels is assigned to the segmented region when the clearance assigned to the respective pixel is below the settable threshold value, and when the intensity value assigned to the respective pixel is within a settable interval around the intensity value assigned to the selected color. The stated conditions are linked to one another by a logic conjunction, so that all conditions must be met in order for the corresponding pixel to be assigned to the segmented region. Thus, in the case of an achromatic selected color, a particular combination of conditions is applied, which in said case provides even better results than the above-described combination of conditions based on hue. The interval lying around the intensity value of the selected color, i.e. the limits of said interval, can preferably be set by the user, particularly preferably interactively via a human/machine interface.

In this particularly preferred embodiment, the above-described step of providing the colors assigned to the pixels and the selected color in accordance with the second color model is specified as being carried out when the selected color is not achromatic.

In this particularly preferred embodiment, the above-described step of assigning one of the pixels to the segmented region when the clearance assigned to the corresponding pixel is below the settable threshold value and when the hue assigned to the corresponding pixel is within the settable interval around the hue assigned to the selected color is specified as being carried out when the selected color is not achromatic.

This particularly preferred embodiment has the advantage that, in the case of an achromatic selected color, the pixels are processed in a particular way in which they are assigned or are not assigned to the segmented region in a manner even more consistent with human perception.

The assignment of one of the pixels to the segmented region when the selected color is not achromatic, and when the clearance assigned to the corresponding pixel is below the settable threshold value, and when, in the presettable interval, the hue assigned to the corresponding pixel is around the hue assigned to the selected color is preferably carried out for each of the pixels.

Similarly, the assignment of one of the pixels to the segmented region when the selected color is achromatic, and when the clearance assigned to the corresponding pixel is below the settable threshold value, and when the intensity value assigned to the corresponding pixel is around the intensity value assigned to the selected color in the presettable interval is preferably carried out for each of the pixels.

The colors assigned to the pixels and the selected color in accordance with the second color model are preferably provided in that the colors assigned to the pixels in accordance with the RGB color model and the selected color described in accordance with the RGB color model are each converted to a description in accordance with the HSV color model. Since the RGB color model is widely used in image processing, in most cases the colors assigned to the pixels and the selected color are present in a description in accordance with the RGB color model, so that these must be converted from the RGB color space to the HSV color space.

In a further step of the method according to the invention, which is preferably carried out, the segmented color image or at least the segmented region is displayed. The display is preferably carried out on a display unit, specifically on a monitor. The at least one segmented region is preferably marked or indicated by a highlight in the color image, for example by a false-coloring technique, or by not displaying the remaining regions of the color image, or by not displaying only the segmented region.

The segmented region is preferably displayed within a graphic user interface, which is likewise part of the human/machine interface for selecting the color to be selected and for inputting the threshold value and the interval. The user is preferably prompted by the human/machine interface to first select the color to be selected, then to select the threshold value for the clearance and then to select the interval, with the user preferably being prompted either to adjust the interval of the intensity value in the case of an achromatic selected color or to adjust the interval of the hue in the case of a non-achromatic selected color.

For selecting the color, a graphic selection tool, e.g. a pipette, is preferably displayed to the user. For adjusting the threshold value and the interval, graphic adjustment elements, e.g. slide controllers, are preferably displayed to the user. The manual selection of the color and the manual adjustment of the adjustment elements preferably result in the immediate display of the segmented region resulting from the adjusted selection of the color or the segmented region resulting from the adjusted threshold value or the segmented region resulting from the adjusted interval. The selection tool and the adjustment elements are preferably set initially to default values. The default values for the corresponding interval are preferably adjusted such that the intensity value of the selected color or the hue of the selected color lie at the center of the corresponding interval.

The digital microscope according to the invention comprises an image capturing unit, which is preferably embodied as an electronic image converter, e.g. a CCD sensor or a CMOS sensor. The digital microscope further comprises an image processing unit which is designed for carrying out the method according to the invention. The image processing unit may be embodied as an integral component of the digital microscope. However, the image processing unit may also be a freely programmable computer assigned to the digital microscope, for example. The image processing unit is particularly designed for implementing preferred embodiments of the method according to the invention. The digital microscope according to the invention preferably also has those features that are described in connection with the method according to the invention above.

The digital microscope preferably comprises a display unit embodied, e.g., as a monitor. The display unit is used to display the images captured by the image capturing unit, in particular for displaying the segmented color image, or at least the at least one segmented region.

The digital microscope preferably further comprises a human/machine interface, which particularly enables the selection of the color that represents the region to be segmented, the setting of the threshold value for the clearance, and the setting of the interval around the hue assigned to the selected color, and if applicable, the setting of the interval around the intensity value assigned to the selected color. The display unit is preferably part of the human/machine interface. The human/machine interface is particularly preferably designed such that changes in the selection of the color and in the setting of the threshold value and the stated intervals directly affect the display of the segmented region.

BRIEF DESCRIPTION OF THE DRAWINGS

Additional advantages, details and enhancements of the invention will be apparent from the following description of a preferred embodiment of the invention, with reference to the drawing.

FIG. 1 is a schematic flow chart of a preferred embodiment of the method according to the invention. In a first step, a color image made up of pixels in RGB format is provided, and the user selects a color present in the color image, said color being present in a region of the color image to be segmented as desired by the user. The user will therefore select a color that is typical of the region to be segmented and is predominantly present there. The region to be segmented need not be contiguous.

DETAILED DESCRIPTION

The color image is particularly the image which has been captured using a digital microscope.

In a further step, a distance map is generated in the RGB color space. In the distance map, each pixel of the color image is assigned a value for the Euclidean distance between the RGB color values for the corresponding pixel and the RGB color values for the selected color.

In the next step, a first segmentation step is carried out. For each pixel, a check is made to determine whether or not the value for the Euclidean distance assigned to said pixel reaches a threshold value set by the user. This results in a logic value for a "Segment 1" variable for each pixel.

In the next step, a check is made to determine whether the selected color is a gray, i.e., whether it is black, gray or white, which is equivalent to the criterion of whether the selected color is achromatic. In that case, the values for the red, green and blue components are equal.

In the majority of cases, the selected color will not be a gray, i.e. it will be chromatic, whereupon the color image and the selected color must first be converted from the RGB color space to the HSV color space. However, it is particularly the hue component, i.e. the color component, that is relevant for the next step, and therefore the other components can be disregarded.

In this next step, a second stage of segmentation is carried out. Each pixel is checked to determine whether the hue component value assigned to it is higher than an upper interval limit set by the user or lower than a lower interval limit set by the user, i.e. whether or not the hue component value is within an interval set by the user. The interval set by the user encompasses the value for the hue component of the selected color. This results in a logic value for a "Segment2" variable for each pixel.

In the next step, the "Segment1" and "Segment2" variables for each of the pixels are linked to one another by a logic AND operation. The pixels are then each assigned to the segmented region if the "Segment1" variable and the "Segment2" variable are each logically true for the pixel in question. The segmented region is thereby established and the segmentation in this case of a chromatic selected color is complete.

In other cases, the selected color will be a gray, i.e. achromatic, in which case gray scale values for the pixels of the color image and for the selected color must first be determined, in order to carry out a second stage of segmentation in these cases as well. This second stage of segmentation is different from the second stage of segmentation described above for a non-achromatic selected color. More specifically, in the case of an achromatic selected color each pixel is checked to determine whether the gray scale value assigned to it is higher than an upper interval limit set by the user or lower than a lower interval limit set by the user, i.e. whether or not the gray scale value is within an interval set by the user. The interval set by the user encompasses the gray scale value for the selected color. This results in a logic value for a "Segment2" variable for each pixel.

In the next step, the "Segment1" and "Segment2" variables for each of the pixels are linked to one another by a logic AND operation. The pixels are then assigned to the segmented region if the "Segment1" variable and the "Segment2" variable are each logically true for the pixel in question. The segmented region is thereby established and the segmentation in this case of an achromatic selected color is complete.

Regardless of whether or not the selected color is a gray, the segmented region is ultimately displayed to the user, for example by highlighting the region in the color image or by not displaying the remaining regions of the color image.

The invention claimed is:

1. A method for segmenting a color image composed of pixels, which has been captured using a digital microscope, wherein the digital microscope captures images by an electronic image converter, said method comprising the steps of:
   selecting a color present in the color image to be segmented, wherein said color represents a region to be segmented of the color image;
   providing the colors assigned to the pixels and the color selected in the color image in accordance with a first color model based on three color stimuli;
   determining a clearance for each of the pixels, which represents a distance between the color selected in the color image and the color of the corresponding pixel in accordance with the first color model;
   checking to determine whether the color selected in the color image is achromatic;
   determining intensity values for the colors assigned to the pixels and for the color selected in the color image if the selected color is achromatic;
   assigning one of the pixels to the segmented region when the color selected in the color image is achromatic, and when the clearance assigned to the corresponding pixel is below a settable threshold value, and when the intensity value assigned to the corresponding pixel is within a settable interval around the intensity value assigned to the color selected in the color image;
   providing the colors assigned to the pixels and the color selected in the color image in accordance with a perception-oriented second color model, for which purpose at least in each case one hue is determined for the colors assigned to the pixels and for the color selected in the color image when the color selected in the color image is not achromatic; and
   assigning one of the pixels to the segmented region when the color selected in the color image is not achromatic and when the clearance assigned to the corresponding pixel is below a settable threshold value, and when the hue assigned to the corresponding pixel is within a settable interval around the hue assigned to the color selected in the color image;
   displaying an indication of the segmented color image on a display unit.

2. The method according to claim 1, wherein the intensity values for the colors assigned to the pixels and for the color selected in the color image are determined by determining gray scale values for the colors assigned to the pixels and for the color selected in the color image.

3. The method of claim 1, wherein the determination as to whether the color selected in the color image is achromatic is made by checking to determine whether the color selected in the color image described in accordance with the first color model has equal values for the three color stimuli.

4. The method of claim 1, wherein the first color model is the RGB color model.

5. The method of claim 1, wherein the clearance is defined as the Euclidean distance.

6. The method of claim 1, wherein the second color model is the HSV color model.

7. The method according to claim 6, wherein the hue is defined as the hue component of the HSV color model.

8. A digital microscope comprising an image capturing unit and an image processing unit linked to the image capturing unit, which is configured for carrying out a method according to claim 1.

9. The digital microscope according to claim 8, further comprising a display unit for displaying the segmented color image.

* * * * *